Patented Jan. 26, 1932

1,842,428

UNITED STATES PATENT OFFICE

FLORAIN J. SHOOK, OF AKRON, OHIO, ASSIGNOR TO NATIONAL RUBBER MACHINERY COMPANY, OF AKRON, OHIO, A CORPORATION OF OHIO

TIRE BAND MACHINE

Application filed December 13, 1929. Serial No. 413,786.

This invention relates to tire-building machines and especially those of the drum type for building flat or semi-flat bands to be shaped into pneumatic tire casings.

One of the objects of my invention is to provide improved means for positively feeding rollers or stitcher wheels over the tire form to compact the components of the band upon each other. A further object is to provide improved means for automatically reversing the travel of the stitchers at the limit of their outward feeding movement and returning them to their starting positions.

A still further object is to automatically accomplish a dwell of the stitchers in rolling contact with the material on the drum before commencing their feeding movement, in order to avoid the occurrence of a ridge at the middle of the band or other point where the feeding movement begins, said dwell being followed by feeding travel of the stitchers.

These and other objects are accomplished by the mechanism hereinafter described and illustrated in the drawings.

Fig. 4 is a partial front elevation and section from the plane 4—4 of Fig. 1.

Figure 1:
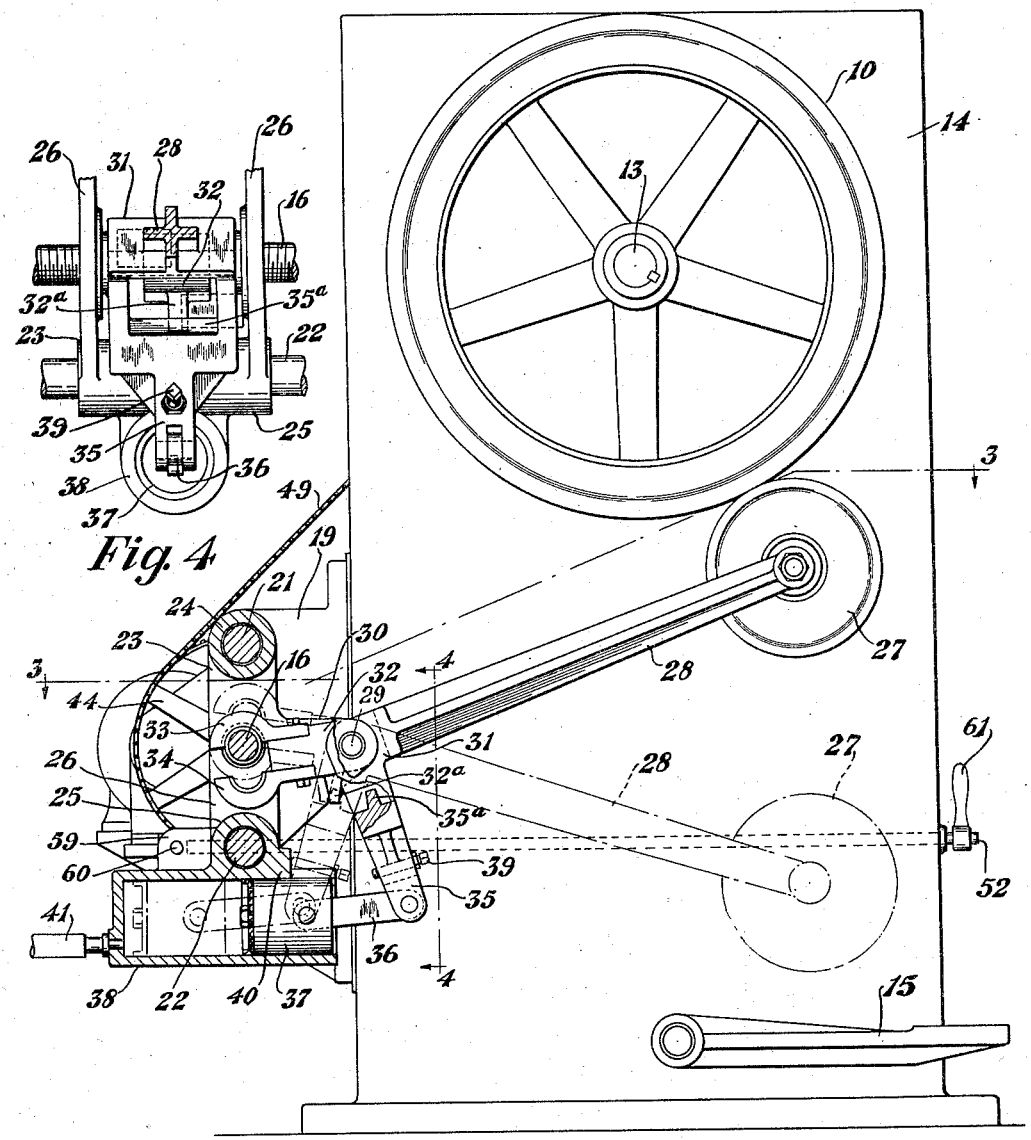
Fig. 1 is a side elevation, partly broken away and in section, illustrating my improved tire-building machine.

In the illustrated embodiment I have shown stitcher arms pivoted for movement into and out of operative relation with the drum, together with a screw-and-nut gearing embodying a reversible feed-screw and half-nuts actuated by the respective arms to engage the screw in the elevated and depressed positions of said arms respectively, for positively feeding the stitcher arms, together with arm-feeding brackets mounted on guides parallel with the feed-screw and having a lost-motion connection with the nut members for effecting a dwell of the stitcher wheels. This mechanism is simple, compact and positive in its action, but the fundamental principles of its structure and mode of operation might be variously embodied, and the invention is not wholly confined to the particular form here shown.

In the drawings, 10 is a rotary tire form, in this case a semi-flat band-building drum having a substantially cylindrical middle portion 11 and conical end portions or bead seats 12 of smaller diameter. Said drum is fixed on the outer end of a horizontal shaft 13 mounted in bearings in a casing 14 which contains the usual driving motor and change-speed gearing controlled by a pedal 15.

Located at the back of the machine, below the level of the drum 10, is a horizontal screw shaft 16 having right-hand and left-hand screw threads 17, 18 for feeding the two stitchers in opposite directions. Said shaft is mounted to turn in bearings in a bracket 19 mounted on the back wall of the casing 14 and an outer bracket 20 supported on a floor or base. 21, 22 are a pair of guide-rods secured at their ends in said brackets and mounted parallel with the screw shaft 16 above and below the latter.

Slidingly mounted on the guide-rods 21, 22 are a pair of stitcher-arm supports consisting of feed-brackets or frames 23, 23, each comprising upper and lower guide-sleeves 24, 25 integrally connected by a pair of vertical side plates or bars 26, 26 apertured for the free passage of the screw shaft 16.

A pair of disk-like rollers or stitcher wheels 27 are mounted to turn freely on horizontal arbors carried at the forward ends of a pair of stitcher arms 28, each forming part of a lever pivoted on a pintle 29 between a pair of ears 30 which carry the pintle, said ears projecting forwardly from the side plates of the brackets 23. The rear end of each stitcher arm is formed with a forked hub portion 31, and between the sides of the fork is mounted a nut member 32 adapted to turn and also to slide axially upon the pintle 29. Each nut member carries upper and lower half-nuts 33, 34 adapted alternatively to engage the feed screws 17 and 18 on opposite sides of the latter, and horizontally offset from each other so that the lower half-nuts may run off the inner ends of the screw threads into registry with a plain, reduced portion 16ª of the screw shaft while the upper half-nuts remain in registry with the threads. The outer ends of said half-nuts are adapted for engagement with the respective outer and inner side plates 26 of the brackets 23, the aggregate length of said half-nuts being slightly less than the distance between the side plates to provide for a lost-motion connection or pickup between the nut members and the brackets.

For swinging the stitcher arms 28 from the depressed, inoperative position indicated in broken lines in Fig. 1 to the operative position indicated in full lines, and thus bringing their stitcher wheels 27 against the tire material on the drum 10, I provide each of the arms with a lever arm 35 projecting downwardly from its forked hub-portion 31, said arm connecting by a link 36 with the piston 37 of a fluid-pressure cylinder 38 cast integrally with the lower sleeve member 25 of bracket 23. When pressure fluid, such as compressed air, is admitted to the cylinder, its piston will be projected to elevate the corresponding stitcher arm and wheel, and when said cylinder is discharged, the stitcher parts will fall by gravity until arrested by a stop formed by the rear end of a screw 39 on the arm 35 engaging a stop shoulder 40 on the bracket casting. Cylinder 38 is connected by a pipe 41 with a suitable control valve, not shown.

An angular lost-motion or pick-up connection is provided between the stitcher levers 28 and the nut members 32 by means of a lug 32ª on each nut member, located in the path of a mating lug or flange 35ª on each lever arm 35. On the up-stroke of the stitcher arm, the corresponding nut member falls by gravity to bring its upper half-nut 33 into mesh with the upper side of the screw thread, and the lugs 32ª, 35ª then separate while the stitcher arm continues its upswing to bring its stitcher wheel against the band on the drum, the stitcher being then free to follow the contour of the band. On the down-stroke, the stitcher lever picks up the nut member, unmeshing the upper half-nut and finally meshing the lower half-nut 34 with the under side of the thread to gear the stitcher parts for their return movement.

For reversibly rotating the screw shaft 16, its end is extended to carry a splined clutch-collar 42 having respective members of a pair of positive jaw clutches, one of which is adapted to engage a complemental clutch member 43 formed on a sprocket wheel 44 loosely surrounding the screw shaft, and the other to engage a complemental clutch member 45 on a shaft 46 driven by an electric motor 47, there being a reduction gearing 48 interposed between said motor and shaft. Sprocket wheel 44 is driven through a chain 49 from a smaller sprocket wheel 50 on the drum shaft 13. Sprocket 44 rotates at a relatively-slow speed to impart the outward feeding movement to the stitchers as compared with the shaft 46 which rotates at a relatively-high speed to impart the stitcher-returning movement.

Clutch-sleeve 42 is axially moved by a rocker arm 51 loosely pivoted on a suitably-supported rock-shaft 52 which is adapted to be engaged with some lost motion by fork lugs 53 on the upper arm of a rock-lever 54, the latter being yieldingly urged by a pull-spring 55 in a direction to engage the collar 42 with the reversing clutch member 45.

Clutch lever 54 is held in the position indicated in Fig. 1 to engage the collar 42 with the stitcher-feeding clutch member 43 by engagement of a pin on its lower end with a shoulder on the horizontal arm of a latch-lever 56 pivoted at 57. The vertical arm of said latch-lever is pivotally connected with one end of a horizontal trip-rod 58 whose other end is slidingly supported in a tripping and guide ear 59 on the rear side of the inner feed bracket 23, said rod having adjustably fixed thereon a tripping collar 60 for engagement by the lug 59 at the outer end of the feed stroke of the stichers. For manually setting the rock-lever 54 in the latched position shown in Fig. 2, with the clutch sleeve 42 and member 43 engaged, its rock-shaft 52 is extended through the casing 14 to the front thereof and provided with a handle 61 for turning it. Rock-shaft 52 may also be employed to actuate the valve for controlling the stitcher-setting cylinder 38 to charge the same when rock-lever 54 is thrown to its latched position just described, and to discharge it when released and thrown by the spring 55 to the opposite position.

Figure 2:
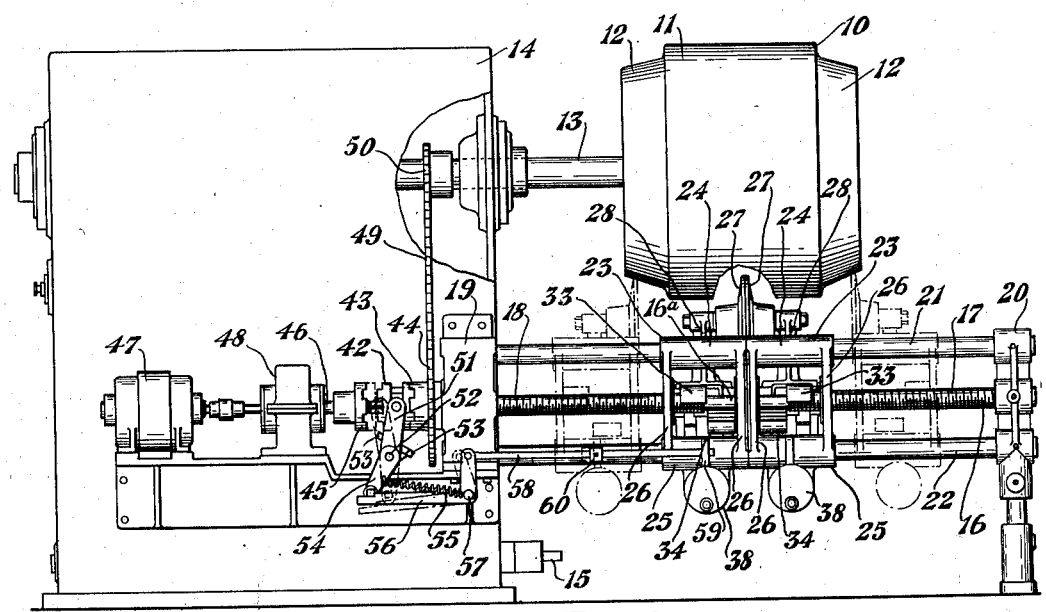
Fig. 2 is a rear elevation thereof, partly broken away.
Figure 3:
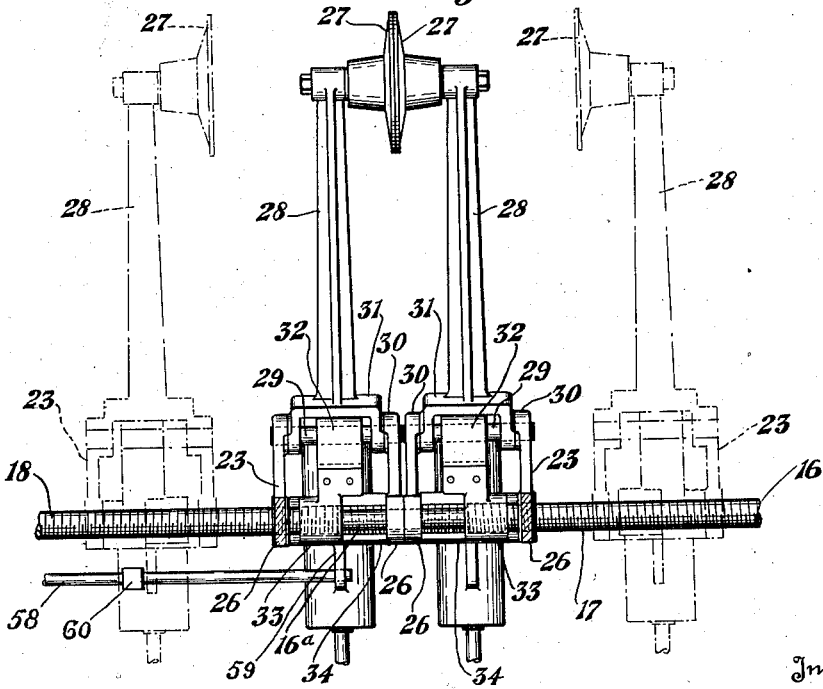
Fig. 3 is a plan view of the stitcher mechanism and feed-screw from the section plane 3—3 of Fig. 1.

In the operation of this machine, assuming the stitchers 27 to have been brought together and depressed to their inoperative positions, and the drum 10 in rotation with tire material thereon, the operator turns the handle 61 to charge the cylinder 38, thereby elevating the stitchers against the material on the drum and dropping the nut members 32 to mesh their upper half-nuts 33 with the threads on the screw shaft 16, and at the same time to throw the rocker arm 54 to the latched position indicated in Fig. 2 and engage the clutch members 42 and 43, thus rotating the screw shaft from the drum shaft 13 through the chain and sprocket gearing in a direction to feed the stitchers outwardly.

The stitchers dwell in their initial position at the center line of the drum for several revolutions of the latter while the half-nuts 33 are traveling outwardly to close up the spaces between their outer ends and the inner faces of the bracket side plates 26, thereby more fully rolling down the material at the center line and avoiding a ridge at that point. Thereupon the outward travel of the brackets begins and the stitchers are fed across the drum, rolling down and compacting the plies of tire material upon each other. When the stitchers reach the outer edges of the band, the lug 59 on one of the brackets 23 encounters the trip collar 60 on the rod 58, thereby turning the latch-lever 56 to release the rock-lever 54 and permit its spring 56 to reverse the position of the rock-shaft 52. This discharges the cylinder 38, allowing the stitchers to drop to the broken-line position indicated in Fig. 1, bringing the abutments 35ª against abutments 32ª to raise the rear ends of nut members 32 and bring their lower half-nuts 34 into mesh with the threads on the screw shaft 16, at the same time shifting the clutch arm 51 to bring the clutch sleeve 42 and member 45 into engagement so that the motor 47 reversely rotates the screw shaft to return the stitchers to their initial positions at a faster rate than their outward feeding speed, the brackets 23 dwelling for a short time prior to the beginning of their return movement until the lower half-nuts have closed up the spaces between themselves and the inner side plates of the frames. At the completion of the return movement of the stitchers, the lower half-nuts 34 run off the inner ends of the screw threads 17 and 18 and the movement of the stitchers ceases while the rotation of the screw shaft continues. The machine is then ready for another cycle of operations after another ply of material has been placed upon the drum.

I claim:

1. In a tire-building machine, the combination of a rotary tire form, a stitcher movable thereover, a positive driving gear for imparting feed movement to said stitcher, motor means, and reversing means interposed between said motor means and driving gear.

2. In a tire-building machine, the combination of a rotary tire form, a stitcher having an operating feed and return movement thereover, driving means for said stitcher, motor means, and a reversing device interposed between said motor means and driving means and automatically controlled by the traverse of the stitcher.

3. In a tire-building machine, the combination of a tire stitcher, driving means for imparting feeding and return movements to said stitcher, and reversible power means for operating said driving means, including a shiftable driving element controlled by the traverse of the stitcher.

4. In a tire-building machine, the combination of a tire stitcher having opposite feeding and return movements, gearing for imparting said movements, aligned reversely-rotating motor-driven clutch devices for operating said gearing, and a shiftable clutch member reciprocally coacting with said clutch devices and controlled by the traverse of the stitcher.

5. In a tire-building machine, the combination of a tire stitcher, driving means for imparting feeding and return means thereto, motor means for actuating said driving means, a shiftable element in the driving train having a setting device controllable by the operator for connecting said motor means with the driving means to impart said feed movement and biased to a stitcher-returning position, and a retaining device for holding said element in its stitcher-feeding position, said retaining device being actuated by the traverse of the stitcher to release the shiftable element.

6. In a band-building machine, the combination of a rotary band form, a stitcher movable thereover, gearing for imparting feeding and return movements thereto, motor means, and reversible driving connections between said motor means and gearing adapted to impart a relatively-slow feeding movement and a faster return movement to the stitcher.

7. In a tire-building machine, the combination of a rotary tire form, a pair of stitcher wheels movable thereover, a pair of stitcher-wheel carriers interconnected for opposite feeding movement, a rotary power shaft for imparting said feeding movement, and reversible driving means for rotating said shaft.

8. In a tire-building machine, the combination of a feed-screw, a pivoted stitcher arm, half-nuts associated therewith for alternatively engaging opposite sides of said screw, and a tire stitcher carried by said arm.

9. In a band-building machine, the combination of a rotary band drum, a screw shaft mounted parallel therewith and having right and left threads, a pair of stitcher arms pivoted for movement toward and from said drum, half-nuts associated with said arms and movable thereby into engagement with opposite sides of the respective screw threads, and band stitchers carried by said arms.

10. In a tire-building machine, the combination of a feed-screw, a guide parallel therewith, an arm support movable along said guide, a stitcher arm pivoted on said support, half-nuts associated therewith and engageable with opposite sides of the feed-screw, and a tire stitcher carried by said arm.

11. In a tire-building machine, the combination of a feed-screw, an arm support guided for movement parallel therewith, a stitcher arm pivoted on said support and having a tire stitcher, a nut member pivoted on the support and having two half-nuts engageable with opposite sides of the feed-screw, and a lost-motion connection between said arms and nut member.

12. In a tire-building machine, the combination of a rotary tire form, a tire stitcher, driving mechanism for feeding said stitcher, and means for automatically accomplishing a dwell of the stitcher in contact with the material on the rotating form before the stitcher begins its feed movement.

13. In a band-building machine, the combination of a rotary band drum, a pair of stitchers having opposite feed movements over said drum from a position substantially together, outwardly to the edges of the drum, and feeding means for so moving the stitchers, including a lost-motion device for accomplishing a dwell of said stitchers in contact with the material on the rotating drum, and the inner end of their stroke, before beginning their outward feed movement.

14. In a tire-building machine, the combination of a rotary tire form, a stitcher arm having a tire stitcher and pivoted for positioning movement toward and from the form, reversible mechanism for imparting stitcher-feeding and return movements to the arm, a lost-motion device in said mechanism, and means actuated by the traverse of the stitcher arm and controlling said mechanism for automatically reversing the travel of the arm at the completion of its feed stroke.

15. In a tire-building machine, the combination of a rotary tire form, a stitcher having feeding and return movements thereover, a feed-screw, a nut engaging the screw for feeding said stitcher, and a lost-motion connection between said nut and stitcher for accomplishing a dwell of the stitcher in contact with the material on the rotating drum before the stitcher begins its feeding movement.

16. In a band-building machine, the combination of a feed-screw, a nut member having a pair of half-nuts alternatively engageable with opposite sides of said feed-screw, an arm support having a lost-motion feed connection with said nut member, a stitcher arm pivoted on said support for imparting the screw-engaging movement to said nut member and adapted to be fed by the traverse thereof, and a band stitcher carried by said arm.

17. In a tire-building machine, the combination of a rotary tire drum, a screw shaft mounted parallel therewith and having right and left threads, a pair of arm-supporting brackets guided for movement parallel with the shaft, a pair of nut members pivoted on said brackets and each having a pair of half-nuts alternatively engageable with opposite sides of one of the screw threads, each of the nut members having a lost-motion feed connection with its bracket for accomplishing a dwell of the latter before beginning its feed movement, a pair of stitcher arms pivoted on the respective brackets coaxially with the nut members and each having an angular lost-motion connection with one of the latter, and tire stitchers carried by said arms.

18. In tire-building apparatus, the combination of a rotatable tire-building form, a stitching tool adapted to operate upon a tire on said form, a support for said tool, a rotatable screw engaging said tool support adapted to feed it in the direction parallel to the axis of the form, and means for reversing the rotation of the screw automatically when the tool support reaches a determinate position.

19. In a tire-building apparatus, the combination of a rotatable tire-building form, revolvable stitching members, supporting members for said stitching members, a rotatable screw formed with right and left hand threads engaging said supporting members adapted to feed them in opposite directions laterally of the form, and means for reversing the rotation of the screw automatically when one of the supporting members reaches a determinate position in its course.

20. In a tire-building apparatus, the combination of a rotatable tire-building form, a pair of revolvable stitcher members, respective carriages supporting said stitcher members, a screw formed with right and left hand threads engaging said carriages adapted to feed them laterally of the form, respective power members on said carriages for moving the stitcher members toward and away from the form, means for rotating the screw and automatic means for actuating the power members to move the stitcher members toward the form momentarily before the screw initially starts rotating.

21. Tire-building apparatus as defined in claim 20 including means for reversing the direction of rotation of the screw and for concurrently moving the stitcher members away from the form automatically when a carriage reaches a determinate position.

In witness whereof I have hereunto set my hand this 30th day of November, 1929.

FLORAIN J. SHOOK.